Nov. 8, 1932.  E. D. TILLYER ET AL  1,887,049
DEVICE FOR TESTING THE EYE
Filed Oct. 31, 1927  2 Sheets-Sheet 2
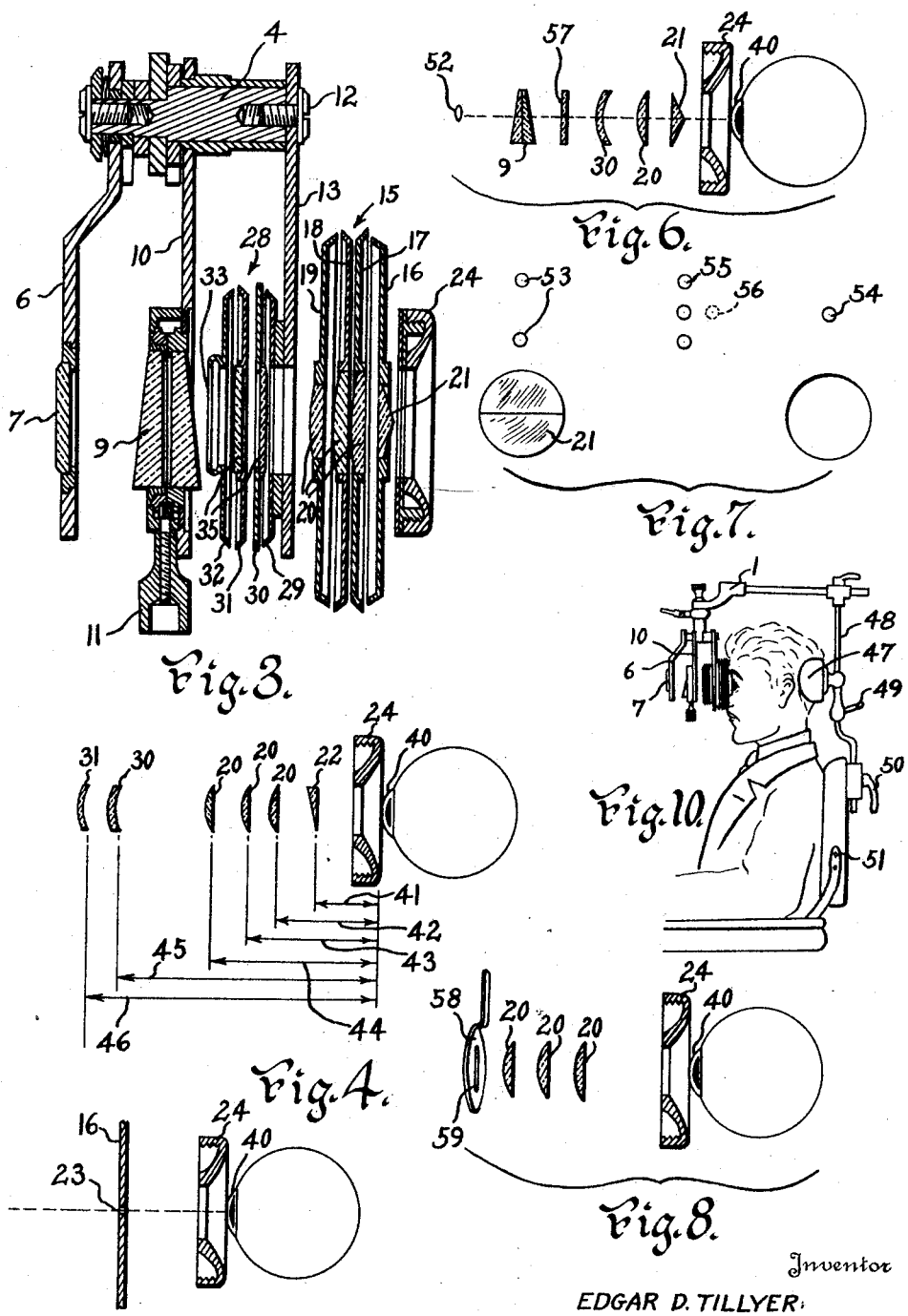
Inventor
EDGAR D. TILLYER,
ELMORE A. FORSHEY,
IVAN S. NOTT.
By Harry H. Styll
Attorney Patented Nov. 8, 1932

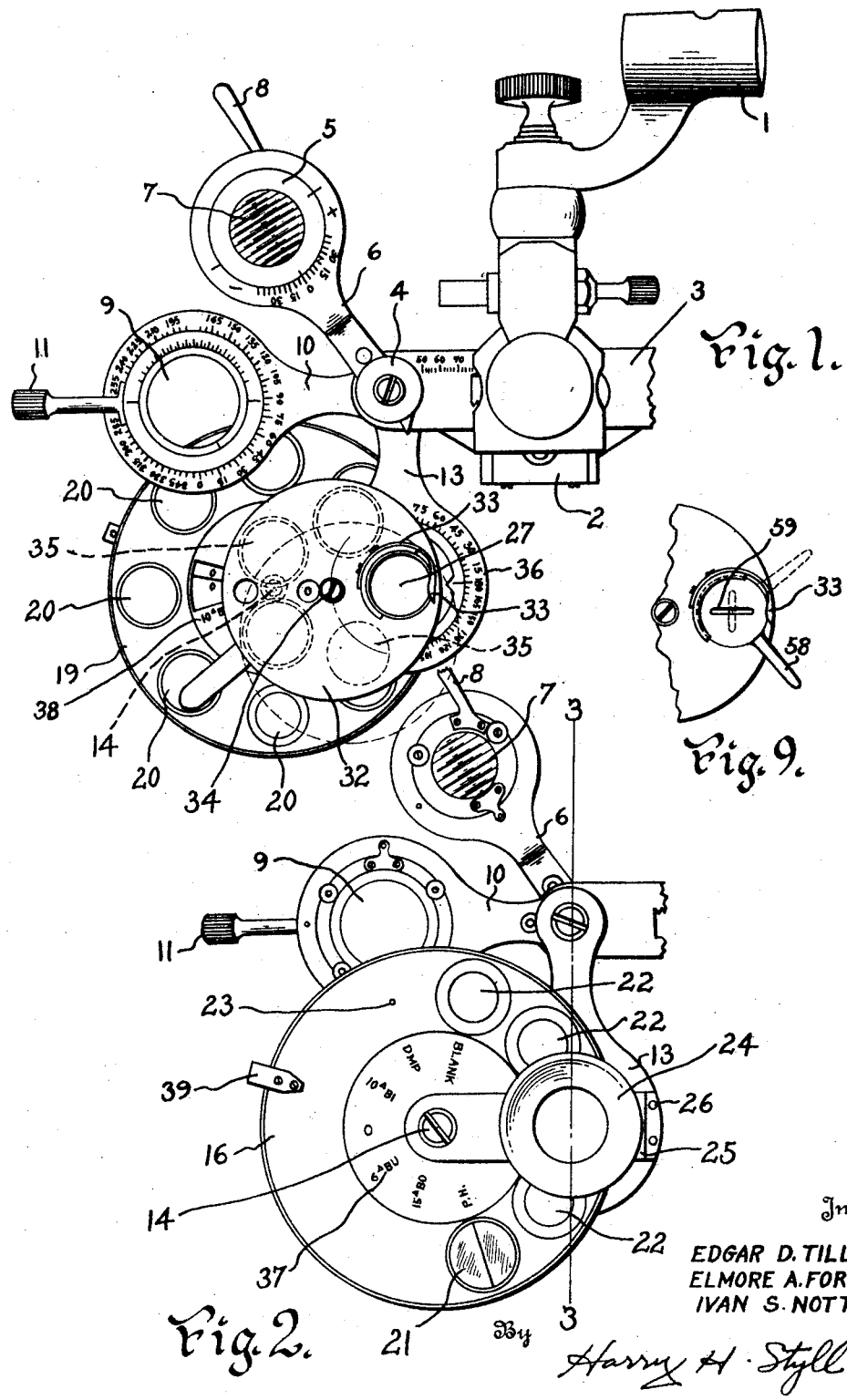

1,887,049

UNITED STATES PATENT OFFICE

EDGAR D. TILLYER, OF SOUTHBRIDGE, MASSACHUSETTS, ELMORE A. FORSHEY, OF NEW YORK, N. Y., AND IVAN S. NOTT, OF TORONTO, ONTARIO, CANADA, ASSIGNORS TO AMERICAN OPTICAL COMPANY, OF SOUTHBRIDGE, MASSACHUSETTS, A VOLUNTARY ASSOCIATION OF MASSACHUSETTS

DEVICE FOR TESTING THE EYE

Application filed October 31, 1927. Serial No. 230,095.

This invention relates to improvements in eye testing instruments and has particular reference to that type of eye testing instrument known as a phoro-optometer.

The principal object of the invention is to provide improved means whereby the various lenses of an instrument of this type will lie at a calculated distance from the eye of the patient during the test of the eyes so that the instrument will give the exact and correct prescriptive power of the lens that is to be worn by the patient as a result of the test.

Another object of the invention is to provide improved means in an instrument of this type for making the pin hole test of a patient's eyes whereby pathological defects of the eyes may be noted and studied.

A further object of the invention is to provide improved means for making a stenopaic slit test with an instrument of this type whereby it will be possible to isolate different meridians of the eye in testing for strong defects of astigmatism and mixed astigmatism and facilitating the correction of these different errors.

Another object of the invention is to provide improved means for throwing into and out of alignment with the sight opening a double Maddox prism to test for the muscular defects of the eye after the refractive errors have been determined.

Another object of the invention is to provide front and back dial markings so that the instrument may be read from both the front and the back.

Another object of the invention is to provide improved means for holding the head of the patient in exact position with relation to the location of the lenses in the instrument so that the test may be made at a prescribed distance from the eye to the lenses, insuring that the prescription lens will be of the same power as the test lenses under which the test was made.

Other objects and advantages of the invention will be apparent from the following description taken in connection with the accompanying drawings and it will be apparent that many changes in the arrangement of parts and details of construction may be made without departing from the spirit of the invention as set forth in the accompanying claims. We, therefore, do not wish to be limited to the exact arrangement of parts and details of construction, as the preferred forms only have been shown by way of illustration.

Referring to the drawings:

Fig. 1 is a front elevation of the instrument, one side thereof having been removed;

Fig. 2 is a back or rear elevation of Fig. 1 with the supporting bracket portion removed;

Fig. 3 is a cross section taken approximately on line 3—3 of Fig. 2, showing the auxiliary lens holders in cross section;

Fig. 4 is a diagrammatic cross section through the sight opening showing the relationship of the eye, the sight opening and the various lenses of the instrument;

Fig. 5 is a diagrammatic cross section through the eye, the sight opening and the lens disc nearest the eye showing the arrangement of the parts for the pin hole test for pathological conditions of the eye;

Fig. 6 is a diagrammatic cross section through the eye, the sight hole and the various lenses of the instrument showing the arrangement of the lenses in making the test with the double Maddox prism for determining the muscular troubles of the eye after the refractive errors have been determined;

Fig. 7 is a diagrammatic view illustrating the test made with the arrangement shown in Fig. 6;

Fig. 8 is a diagrammatic cross section through the eye, the sight hole and lens arrangements showing the arrangement of the parts when making the stenopaic slit test;

Fig. 9 is a partial front view showing the stenopaic slit test unit;

Fig. 10 is a side elevation showing the means for supporting the patient's head during the testing operations whereby the lenses may be placed at the proper position with relation to the eye of the patient.

Referring to the drawings wherein similar characters of reference are employed to denote corresponding parts throughout, the instrument comprises broadly a supporting bracket 1, the levelling device 2, means 3 for adjusting the distance between the eyes of the patient and the lens carrying support 4. On the lens carrying support 4 is pivotally mounted a Maddox rod attachment 5 on the arm 6 having a Maddox rod 7 and a handle 8 for turning the Maddox rod. Pivotally mounted on the lens carrying support 4 is the double rotary prism 9 carried by the arm 10 and rotated by the handle 11. Rigidly secured to the lens carrying support 4 by the screw 12 is a bracket 13. This bracket does not rotate on the lens carrying support 4. Pivoted to the bracket 13 at 14 is the lens holding casing 15. The lens holding casing 15 comprises four rotatable discs 16, 17, 18 and 19, all of which rotate about the center 14. In the discs 17, 18 and 19 are mounted the spherical lenses 20. The disc 16 carries the double Maddox prism 21, a plurality of prismatic lenses 22 and a pin hole 23, see Fig. 2. Also secured to the bracket 13 and rigidly related thereto is the sight hole member or eye cup 24 being secured thereto by the bracket 25 and the screws 26, see Fig. 2. Pivoted on the bracket 13 for rotative movement about the center 27 of the eye cup 24 is the cylinder lens casing 28. This casing 28 comprises the cover plate 29, the rotative cylinder lens discs 30 and 31 and the cover plate 32 having the auxiliary lens cell 33. The rotative cylinder lens discs 30 and 31 are pivoted for rotative movement about the center 34 and are provided with the cylinder lenses 35. The movement of the cylinder discs about the center 27 of the sight hole 24 is indicated on the scale 36, Fig. 1. The position of the lenses in the disc 16 is indicated on one side by the scale markings 37 and on the other side by the scale markings 38 taken in conjunction with the indicator member 39, see Figs. 1 and 2.

The parts described above, with the exception of the lenses 21, 22 and the pin hole 23 in the disc 16, are the same as the prior art instrument and the operation is the same as the prior art instrument, namely that the Maddox rod lens 7 may be thrown in alignment with the center line of the eye cup by rotating it on the member 6 about the lens carrying support 4. The double rotary prism may be thrown into or out of alignment with the center of the sight opening 24 by rotating it on the member 10 pivoted on the member 4. The cylindrical lenses 35 may be rotated in alignment with the center of the sight opening or eye cup 24 by rotating them about the center 34 and the axis of the cylindrical lenses may be determined by rotating the whole cylindrical case 28 about the center 27 of the eye cup 24. The spherical lenses 20 may be rotated into alignment with the center of the eye cup 24 about the center 14 and the lenses 21 and 22 and the peep opening 23 may be rotated into alignment with the center of the eye cup 24 by rotating them about the center 14. The distance between the eyes is regulated by moving the member 3 until the required distance between the center of the eye cups is determined. The whole instrument is supported by the bracket 1 and the level 2 will indicate whether or not the instrument is level.

The parts of the instrument that are new and novel will now be described in detail. Referring to Fig. 4 it will be noted that the plane of the eye cup 24 is tangent with the eyeball 40, diagrammatically represented, and that the arrows indicate the distance from the plane of the eye cup which is tangent to the eyeball to the various lenses in the lens cells, namely, the distance 41 represents the distance from the eyeball to the lenses in the disc 16, the lens 22 being shown; the distance 42 the distance from the eye ball to the first spherical lens; the distance 43 the distance from the eyeball to the second spherical lens; the distance 44 the distance from the eyeball to the third spherical lens; the distance 45 the distance from the eyeball to the first cylindrical lens; and the distance 46 the distance from the eyeball to the second cylindrical lens. All of these lenses are calculated to power which includes as an element of the calculation the distance from the eyeball to the lens. The lenses in the casings 15 and 28 have all been calculated to this exact distance.

To insure that the proper distance of the various lenses from the eye is obtained during the test provisions have been shown in Fig. 10 to position the head of the patient rigidly against the head support 47. When the operator places the instrument before the eye of the patient he sights along the plane of the eye cup to see that it is tangent with the eyeball, and he supports the patient's head with the instrument in this definitely located position so that there will be no variation from it. This insures that the power of the prescription lens which the tests show is required will be the exact power of the lens that is made for the patient and placed in front of his eye at the required distance from the eye. This is an entirely new and novel feature in instruments of this kind so far as we are aware, and it is true that unless provision of this kind is made the correction of the patient will not be the same as that indicated by the instrument, which has been the trouble with prior art instruments of this nature. The instrument is carried by the support 1, which in turn is carried by the support 48 which carries the head rest 47 which may be properly adjusted by the levers 49 and 50 and which in this instance is carried by the chair 51.

Referring to Fig. 5, the eye 40 is again placed tangent to the plane of the eye cup 24 and the pin hole 23 and the disc 16 is brought into alignment with the center of the eye cup 24. If when the patient looks through the pin hole and there are no lenses in alignment with the eye at the time he finds no improvement in vision due to the restricted orifice of the pin hole there is pathological disease. If he finds an improvement in his vision there is no pathological disease present. This provides simple and efficient means for rapidly determining whether there are pathological diseases to be contended with in addition to the regular refractive and muscular troubles. This too, so far as we know, is a new and novel test with an instrument of this kind.

Referring to Figs. 6 and 7, the eyeball 40 is aligned with the plane of the eye cup 24. The eye is tested for the distance correction, either sphericals, cylinders or combined spherical and cylindrical lenses as usual. Then the double Maddox prism 21, which is a lens having a double bevelled face on one side with the apex of the bevel in the middle of the lens, in the disc 16 is thrown into line with the center of the eye cup 24 leaving the distance correction in place. As shown in Fig. 7, the test is then made to detect and measure the condition of the extrinsic muscles of the eye by directing the eyes of the patient towards a small spot light. The left eye is covered by turning the rear dial into position. The double Maddox prism is placed in front of the right eye and two images will be seen as at 53. The left eye is uncovered and a third image will be seen as at 54. If the two images seen by the right eye and the one seen by the left eye are in perfect alignment, as shown at 55, the extrinsic muscles are normal. If the single image seen by the left eye is deviated to the right, as shown at 56, it shows an insufficiency of the internal rectus muscle. The measure of the insufficiency can be measured by placing the rotary prism 9 into place and introducing sufficient prismatic power with the base in to bring the three images in alignmnet. In making this test the rotary prism 9 is placed before the opposite eye to that which is looking through the double Maddox prism and it will be understood that the rotary prism in Fig. 6 is diagrammatically shown to illustrate the lenses used in the test and is not in accurate position.

Referring to Fig. 8, the eyeball 40 is shown tangent to the plane of the eye cup 24. To make the stenopaic slit test which is carried out to isolate different meridians of the eye and is used for detecting strong defects of astigmatism and mixed astigmatism, a disc 58 having the slot 59 is placed in the auxiliary lens cell 33, then rotate the disc 58 before the eye until the best vision is obtained through the slit; then rotate the disc until the slit stands at right angles to the former position; this will be the position of worst vision. Now correct this last meridian of worst vision with the spherical lenses 20 which may be thrown into line with the eye cup 24 as described above. Now rotate the disc 58 until the slit stands at right angles to the corrected position and again correct with spherical lenses 20. These readings give cross cylinders which are transposed into spherical cylinders. Provision for the stenopaic slit test in an instrument of this character is novel so far as we are aware.

Referring to Fig. 6, the colored lens 57, preferably red, is carried in the line of sight by means of the auxiliary lens holder 33, being inserted in the holder when desired for use and removed therefrom when not required.

From the foregoing description it will be seen that we have provided simple, efficient, inexpensive and improved means for providing lenses in an instrument of this character that are accurately calculated from the position of the patient's eye together with means for insuring that the patient's eye is always in correct position with regard to the lenses during the test; that will permit of the test for pathological defects; that will permit of the stenopaic slit test for defects of strong astigmatism and mixed astigmatism; that will provide means for testing for muscular troubles by means of double Maddox prisms, and that will permit of the readings of the relations of these tests on both front and back of the instrument, in addition to carrying out all of the usual tests and objects of phoroptometers of this character.

Having described our invention, we claim:

1. In a device for testing the eye, a member having a sight opening, an eye cup surrounding the sight opening and having a bounding edge the transverse plane of which is normal to the line of sight of the instrument whereby by sighting across the line of the bounding edge the surface of the patient's eye may be placed tangent to the line of said bounding edge to give a fixed determined position of test, movable lens carrying means, and a lens in the lens carrying means adapted to be moved into or out of line with the sight opening and having as one of the elements determining its power its distance from the bounding edge of the eye cup.

2. In a device for testing the eye, a member having a sight opening, an eye cup surrounding the sight opening and having a bounding edge the transverse plane of which is normal to the line of sight of the instrument whereby by sighting across the line of the bounding edge the surface of the patient's eye may be placed tangent to the line of said bounding edge to give a fixed determined position of test, movable lens carrying means, and a lens in the lens carrying means adapted to be moved into or out of line with the sight opening and having as one of the elements determining its power its distance from the bounding edge of the eye cup, and means for supporting the head of the patient with the surface of the eyeball of the patient tangent with the bounding edge of the eye cup.

3. In a device for testing the eye, a member having a sight opening, movable lens carrying means, lenses in the lens carrying means adapted to be moved into or out of line with the sight opening, said lenses having as one of the elements determining their power their distance from the sight opening a movable double Maddox prism holder, a double Maddox prism in the prism holder adapted to be moved into or out of line with the sight opening, a movable double rotary prism holder, a double rotary prism in the rotary prism holder adapted to be moved into or out of line with the sight opening, means to hold the head of the patient at a fixed determined distance from the sight opening, and means for supporting a colored lens in line of the sight opening and a colored lens in said support, whereby the external muscles of the eye may be tested with color.

4. In a device for testing the eye, a member having a sight opening, sighting means adjacent the sight opening, the line of sight of which is normal to the line of sight of the instrument whereby by sighting along the line of sight the patient's eye may be placed tangent to the said line of sight to give a fixed determined position of test, movable lens carrying means attached to the member having a sight opening, and a lens in the lens carrying means adapted to be moved into or out of line with the sight opening and having as one of the elements determining its power its distance from the said line of sight.

5. In a device for testing the eyes, a member having a sight opening, sighting means adjacent the sight opening and having a line of sight normal to the line of sight of the instrument whereby by sighting along the line of sight the surface of the patient's eye may be placed tangent to the line of sight to give a fixed determined position of test, movable lens carrying means attached to the member having a sight opening, a lens in the lens carrying means adapted to be moved into or out of line with the sight opening and having as one of the elements determining its power its distance from the line of sight, and means for supporting the head of the patient with the surface of the eyeball of the patient tangent to the said line of sight.

6. In a device for testing the eye, a member having a sight opening, movable lens carrying means, lenses in the lens carrying means adapted to be moved into or out of line with the sight opening, said lenses having as one of the elements determining their power their distance from the sight opening, a movable double Maddox prism holder, a double Maddox prism in the prism holder adapted to be moved into or out of line with the sight opening, a movable double rotary prism holder, a double rotary prism in the rotary prism holder adapted to be moved into or out of line with the sight opening, means for supporting a colored lens in line with the sight opening and a colored lens in said support whereby the external muscles of the eye may be tested with color.

7. In a device of the character described, a member having a sight opening, a plurality of movable lens carriers adapted to align the lenses with the sight opening, said lenses having as one of the elements determining their power their distance from the sight opening, a support having a resilient open sided lens cell aligned with the sight opening and a disc having a slit diametrically arranged, said disc being adapted to enter the lens cell through the open side thereof and to be resiliently and rotatably held therein.

8. In a device of the character described, a member having a sight opening, a plurality of movable lens carriers adapted to align the lenses with the sight opening, said lenses having as one of the elements determining their power their distance from the sight opening, a support having a lens cell having an interengaging lens race therein and a disc having a slit diametrically arranged, said disc being adapted to be removably interengaged with the lens race and to be rotated therein.

EDGAR D. TILLYER.
ELMORE A. FORSHEY.
IVAN S. NOTT.